Feb. 26, 1952  J. E. KARLSON  2,586,827
DIRECTIVE RADIATING SYSTEM
Filed March 31, 1945  2 SHEETS—SHEET 1
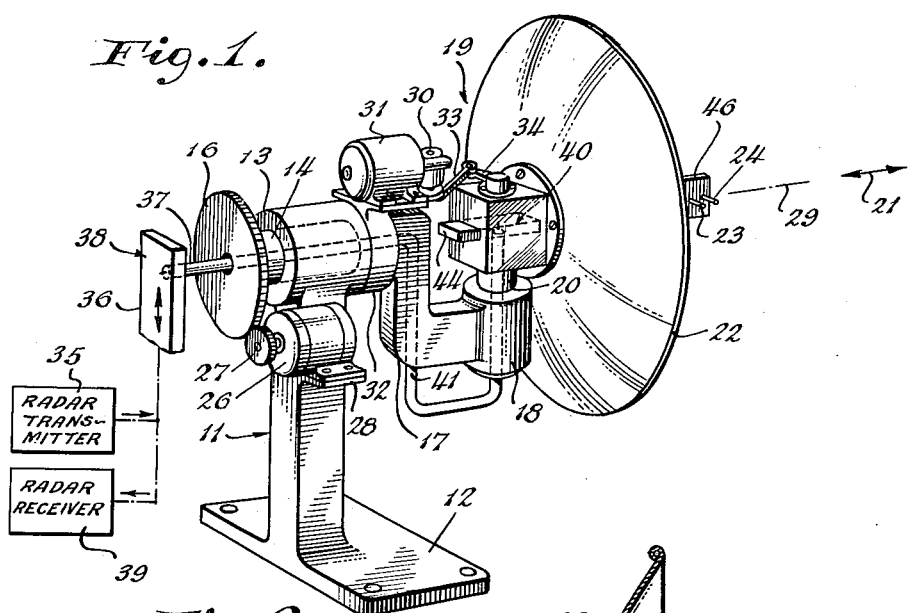
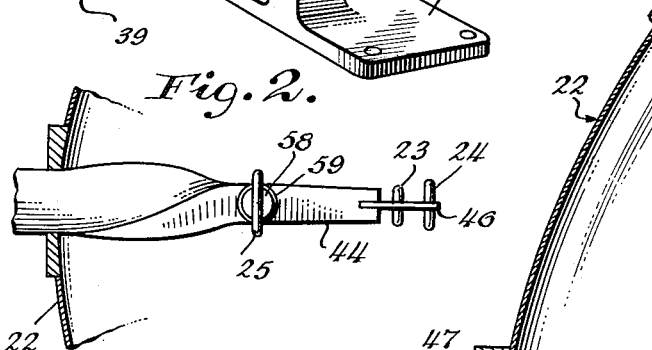
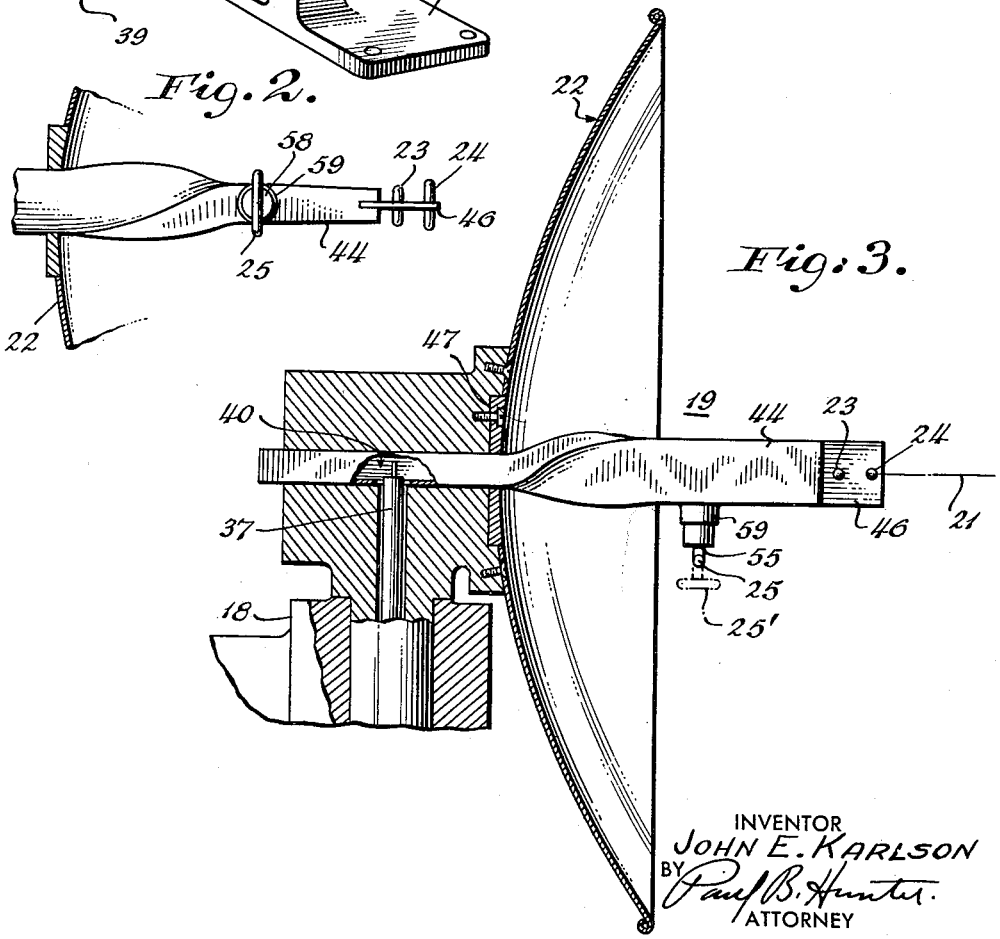
INVENTOR
JOHN E. KARLSON
BY Paul B. Hunter
ATTORNEY Feb. 26, 1952 — J. E. KARLSON — 2,586,827
DIRECTIVE RADIATING SYSTEM
Filed March 31, 1945 — 2 SHEETS—SHEET 2
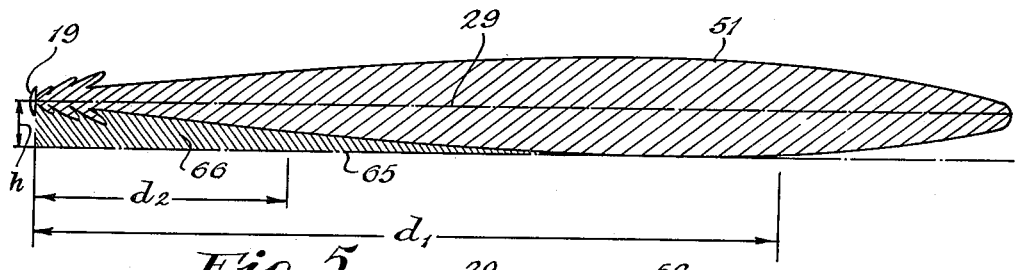
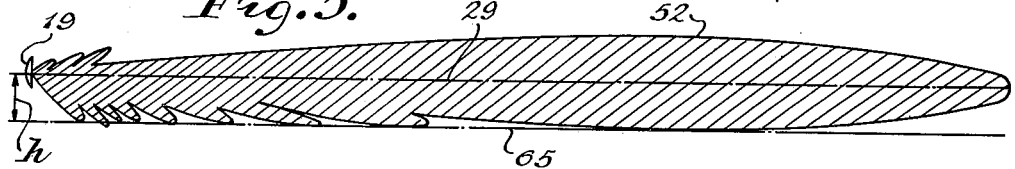
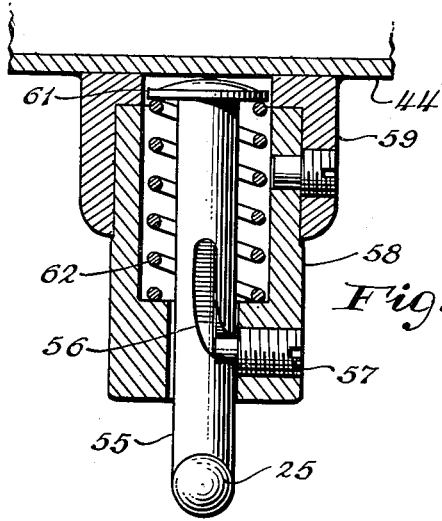
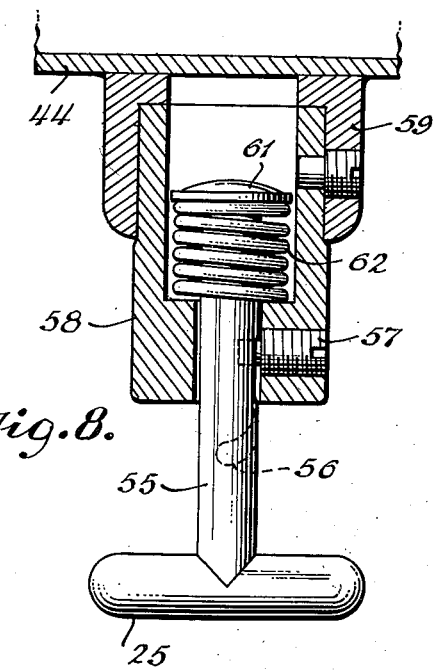
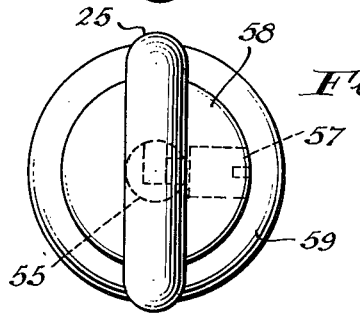
INVENTOR
JOHN E. KARLSON
BY Paul B. Hunter
ATTORNEY

Patented Feb. 26, 1952

2,586,827

UNITED STATES PATENT OFFICE 2,586,827

DIRECTIVE RADIATING SYSTEM

John E. Karlson, Garden City, N. Y., assignor to The Sperry Corporation, a corporation of Delaware Application March 31, 1945, Serial No. 585,825

14 Claims. (Cl. 250—33.65)

The present invention relates to highly directive antenna systems, and to antenna systems especially suited for radio object detection systems.

In certain classes of radio object detection systems, usually referred to as "radar systems," periodic or recurrent movements of a highly directive antenna system are employed for producing periodic variations of strength of signals received from a distant object. These variations indicate the direction of a distant object from the station at which the radar system is operated. The zone of movement and the relative speed of movement of the directive antenna system are determined according to the purpose for which the radio object detection system is employed.

One tactical purpose of a radar system is to aim a night fighter airplane toward a remote object such as another airplane as, for example, toward an enemy aircraft, for permitting the night fighter to direct its fire toward the enemy aircraft. For this purpose, a directive antenna characterized by a very sharp, symmetrical directivity pattern may be motor driven in such a manner that the axis of maximum intensity of the beam is swept through a conical locus ahead of the night fighter airplane, the axis of the conical locus being coincident with the longitudinal axis of the airplane, and the cone angle of the sweep being either constant or periodical varying, as desired.

Another tactical purpose of a radar system on board a fighter aircraft is to determine the positions of ships and other seaborne objects generally below and ahead of the fighter airplane. For this purpose, the scanner is aimed horizontally, and is oscillated through an appreciable azimuthal angular range extending to the right and the left of the direction in which the aircraft is headed. A very sharp directivity pattern of the antenna, symmetrical about the axis thereof, usually is unsatisfactory for this purpose, since such a pattern, while providing effective operation of the radar system in detection of very distant vessels, provides unsatisfactory radar coverage of those vessels lying at positions on the sea near the airplane, and thus appreciably below the horizontal direction from the aircraft. For the purpose of detection of vessels upon the sea, it is desirable that there be provided an antenna having a directivity pattern characterized by appreciable energy transmission at relatively large angles below the axis of the antenna, as well as by very high intensity transmission along the antenna axis.

In accordance with a principal feature of the present invention, apparatus is provided for modifying a directivity pattern of the type commonly used for radar airplane indication, to a directivity pattern suitable for radar indication of the positions of vessels upon the sea.

It is an object of the present invention to provide an improved directive antenna system.

It is a further object to provide an antenna system adapted to be changed quickly and simply from one predetermined directivity characteristic to another.

It has been discovered that a substantially resonant antenna element positioned between a paraboloidal reflector and the focal point thereof, and at a point separate from the axis of the paraboloidal reflector, may be employed in cooperation with a reflector energizing device such as an antenna element, a pair of antenna elements, or a wave guide mouth or horn located at the focal point for distorting the directivity pattern to one side of the paraboloid axis. Improved performance of a radar ship detection system results from the use of an antenna system incorporating such an element.

As a further feature of the present invention, the substantially resonant antenna element separated from the axis of the paraboloidal reflector is arranged to be rotated from a position of maximum effectiveness to an ineffective position. By such a rotation to an ineffective position there is produced a sharp, symmetrical directivity pattern suitable for radar aircraft direction indication. The transfer of the pattern-distorting element from the effective position to the ineffective position may be accomplished by centrifugal force acting on the element during rotation of a part of the antenna system. For this purpose, the pattern-distorting element may be supported by a spring-restrained cam or other mechanical system arranged to rotate the antenna element through a ninety-degree angle. During oscillation without rotation of the directive antenna system, the element may be urged into an effective position by the retaining spring; and during rotation of the system, centrifugal force acting thereon may rotate the element into an ineffective position.

The above objects and general description will be made clear by reference to the following detailed description and the accompanying drawings, wherein like reference characters refer to corresponding parts.

In the drawings,

Fig. 1 is a perspective view of a radar scanning mechanism including an antenna system arranged for alternative operation for seaborne vessel detection or for aircraft direction indication;

Fig. 2 is a fragmentary bottom view showing a portion of the directive antenna system of Fig. 1;

Fig. 3 is a side elevation, partly in section, of the directive antenna system incorporated in the structure shown in Fig. 1;

Figs. 4 and 5 are views of a symmetrical directivity pattern and a distorted or modified antenna directivity pattern, respectively, the latter being especially suited for seaborne vessel detection;

Fig. 6 is an elevation, partly in section, of a directivity pattern modifying element in its effective position;

Fig. 7 is a bottom view of the structure shown in Fig. 6; and

Fig. 8 is a view similar to that shown in Fig. 6, except that the pattern modifying element is shown in the ineffective position to which it is transferred by centrifugal force.

Referring now to Fig. 1, a pedestal 11, having a base portion 12 and a normally horizontal journal bearing 13, supports for rotation in the bearing 13 a shaft 14, having a gear 16 thereupon. Shaft 14 is rigidly attached to an offset arm 17 supporting a normally vertical shaft bearing 18, in which is journaled a shaft 20 to which is attached a directive antenna system 19. A motor 26 having a pinion 27 connected to its shaft for cooperating with the antenna rotation gear 16 is supported on a bracket 28 formed on the side of the pedestal 11.

A second motor 31 is supported on a bracket formed on a collar 32 which is fixed to the shaft 14. Motor 31 may be energized by circuits including slip rings on the shaft 14 and cooperating brushes, the details of which are omitted from the drawing in the interest of clarity. Motor 31 drives an eccentric crank pin about a normally vertical axis through worm gears built into a forwardly extending portion 30 of its housing. The eccentric crank pin driven by motor 31 cooperates with a connecting link 33 and a crank arm 34 rigidly connected to the antenna system 19 for oscillating the antenna system 19 about the axis of the bearing 18.

The motors 26 and 31 may be operated selectively, i. e., when one motor is in operation, the other is not energized. The rotor of the motor 26 is arrested with the offset arm 17 downward and the axis of bearing 18 vertical when the motor 31 is operated to produce oscillation of the antenna system 19 for radar ship detection. On the other hand, the motor 31 may be arrested with the maximum directivity axis 29 of antenna system 19 displaced by a small angle from the axis of the bearing 13 when the motor 26 is employed to produce rotation of the antenna system 19, if conical scan through a fixed cone angle is desired. By virtue of the slight angular displacement of the antenna system axis 29 from the axis of the bearing 13, the operation of motor 26 then sweeps the maximum directivity axis 29 of antenna 19 through a fixed conical locus. If desired, furthermore, the angle of the conical sweep locus of the directive antenna system 19 may be periodically varied during rotation of the system in search for enemy aircraft by operation of motor 31 during the rotation of the antenna system 19 by the operation of motor 26.

Energy from a radio object detection transmitter 35 is coupled to the antenna system 19 through a stationary wave guide 36, which guide also may be employed for conducting energy intercepted by the antenna system 19 to a radar receiver 39. The wave guide 36 may be coupled to a wave guide portion 44 of the antenna system 19 by a coaxial transmission line 37 extending coaxially through the shaft 14 and rigidly connected thereto. A probe coupling joint 38 is formed at the junction of wave guide 36 and coaxial line 37 by ending the outer conductor of the transmission line 37 substantially flush with the wall of the wave guide 36 at an opening therein, and permitting the inner conductor of the line 37 to extend an appreciable distance into the wave guide 36 to be coupled therewith. A similar probe coupling joint 40 may be provided between the transmission line 37 and the wave guide 44. The probe coupling joints 38 and 40 are illustrative examples of well-known junctions suitable for permitting relative rotation of the ultra-high-frequency conduits coupled thereby.

The coaxial line 37 extends through the shaft 14, and thence along the offset arm 17, emerging therefrom at 41 and extending forward and then upward coaxially with bearing 18, to end in the second rotation-permitting probe coupling joint 40.

The directive antenna system 19, shown in Figs. 1, 2 and 3, comprises a metallic reflector 22, dipole antenna elements 23 and 24 located in the region of the focal point of the reflector 22 for radiating energy thereto or receiving energy reflected therefrom, and an energy conduit such as a hollow-pipe wave guide 44 extending through the reflector 22 to the focal region thereof for conducting ultra-high-frequency energy to or from the elements 23 and 24.

In accordance with the present invention, a dipole antenna element 25 is arranged at a position separate from the axis 21 of reflector 22, and between the reflector 22 and elements 23 and 24. The dipole element 25 may be supported in either of two alternative positions, the first being parallel to the elements 23 and 24, and the second, indicated in Fig. 3 at 25' by dotted lines, being parallel to the axis of wave guide 44. In the latter orientation, the dipole element 25 exercises no appreciable effect upon the energy transferred between elements 23 and 24 and the reflector 22, so that the directivity pattern of the antenna system 19 is a conventional symmetrical directive pattern such as is shown at 51 in Fig. 4. With the element 25 in the former orientation parallel to elements 23 and 24, the antenna system 19 produces a distorted, asymmetrical pattern 52 which is illustrated in Fig. 5.

It will be noted that the portion of the pattern 52 above the axis 29 of the antenna system 19 is generally similar to the upper portion of the pattern 51, but that the lower portion of pattern 52 is so modified that appreciable energy is directed downward at large angles below the axis 29. Such a distortion of the directivity pattern of the antenna system 19 is highly desirable for the radar detection of vessels upon the sea, whereas the undistorted symmetrical pattern 51 is desirable for radar aircraft indication.

By reference to Figs. 4 and 5, the suitability of the distorted antenna directivity pattern 52 for aircraft radar detection of ships upon the sea is readily apparent, and the deficiency of the undistorted pattern 51 for this purpose is equally clearly shown. In these views, the antenna system 19 is schematically indicated at a height $h$ above the surface 65 of the sea, a suitable height for consideration here being an altitude of 2,000 feet, for example. For vessels at a distance $d_1$ such as 30 miles in front of the antenna system 19, either the symmetrical pattern 51 or the distorted pattern 52 would give satisfactory results. For a distance of the order of $d_2$, or 10 miles, however, it will be seen that the symmetrical pattern 51 provides insufficient downwardly directed energy, whereas the distorted pattern 52, having appreciable downwardly directed energy lobes, provides satisfactory coverage at this distance. Ideally, the distortion which should be produced in the symmetrical pattern 51 should be of such a nature as to completely enclose the shaded area 66. While the modified or distorted pattern produced by the present invention does not provide absolutely continuous coverage of this essential directivity zone, the enlarged downward lobes produced by the use of antenna element 25 in the operative position very closely approaches an ideal radar ship detection pattern, as Fig. 5 clearly shows.

In one successful embodiment of the present invention operating at a wavelength of approximately 1¼ inches, a paraboloidal reflector 14 inches in diameter having a focal length of approximately 4 wavelengths (approximately 5 inches) is used in conjunction with a wave guide-supplied pair of dipole elements positioned in the focal region of the reflector. One such element would suffice for successful use with the present invention, but two elements in the focal region approximately one-half wavelength apart cooperate to afford improved efficiency of the antenna system. A substantially resonant dipole antenna element is employed in a position approximately two wavelengths from the focal point of the reflector, and approximately one wavelength from the axis thereof. In practice, the dipole element added in accordance with the present invention should be positioned in the region generally indicated by the above representative dimensions, and the position of the element should be shifted in small steps for successive antenna directivity pattern measurements until the optimum pattern modification is produced for a desired set of operating conditions.

The effect of the dipole antenna element 25 directly below the axis 29 upon the vertical-plane directivity pattern of the antenna system 19 is clearly shown by a comparison of Figs. 4 and 5. The element 25 does not appreciably affect the horizontal-plane directivity pattern of the antenna system which, although not illustrated, is generally similar to the undistorted pattern 51, whether the element 25 is in its operative position or its inoperative position.

The structure illustrated in Fig. 1 is suited for installation in the nose of an aircraft such as a night fighter airplane. For this purpose, base 12 may be bolted to the framework of the airplane, with the axis of the bearing 13 aligned with the longitudinal axis of the craft, so that during operation of the motor 26, the axis of symmetry of the conical locus through which the antenna axis 29 is rotated extends along the axis of the craft and thus is aligned with the guns thereon. Therefore, when the radar system is employed for combat against enemy aircraft, detection of an airplane indicating signal showing alignment of the axis of bearing 13 with the detected craft indicates that the longitudinal axis of the night fighter is aimed toward the enemy aircraft. The fixed guns of the night fighter may then be fired, with reasonable expectancy of destruction of the enemy craft.

By retaining the spinning motor 26 stationary, with the offset arm 17 and bearing 18 in the positions illustrated in Fig. 1, the motor 31 may be employed to oscillate the antenna system 19 through an appreciable angle to the right and left, so that the radar system including the transmitter 35 and the receiver 39 may be employed for determining the positions of ships upon the sea. The directivity pattern 52 shown in Fig. 5 is required for this purpose and, accordingly, the antenna element 25 must be positioned parallel to the elements 23 and 24. On the other hand, when the motor 26 is operated to produce movement of the directivity axis 29 through a conical locus, the undistorted radiation pattern 51 is most desirable. Thus, during rotation of the antenna system by the motor 26, the element 25 must occupy the position indicated at 25′ by the broken lines in Fig. 3.

According to one feature of the present invention, the antenna element 25 is arranged to be shifted from its normal operative position parallel to elements 23 and 24 and perpendicular to axis 29, to the inoperative position 25′ (Fig. 3) parallel to axis 29, by centrifugal force acting on the element during rotation of the antenna system 19 by the motor 26. For this purpose, as shown in detail in Figs. 6, 7 and 8, a supporting tubular member 55 having a helical cam slot 56 formed therein is arranged to cooperate with a cam pin 57 which may be held within a fixed housing 58 supported by a bushing 59 from the wave guide 44. The upper end of the tubular member 55 is provided with an enlarged diameter head 61, under which a compressed helical spring 62 contained within the housing 58 acts to urge the tubular member 55 and the antenna element 25 toward the wave guide 44.

When the motor 26 is stationary and the motor 31 is operating to produce oscillation of the antenna system 19, the spring 62 maintains the antenna element 25 in the position in which it is shown in Figs. 2, 3, 6 and 7, the antenna element 25 being parallel to the elements 23 and 24 and thus effective to produce the distorted pattern 52. When the motor 31 is inoperative and the motor 26 is rotating the antenna system 19, centrifugal force acting upon the antenna element 25 and member 55 overcomes the restraining action of the spring 62, causing the element 25 and the tubular member 55 to move outward from the wave guide 44. During this outward movement, the cam pin 57 cooperates with the slot 56 in the tubular member 55 to cause antenna element 25 to be rotated through an angle of ninety degrees, so that the antenna element 25 takes the position indicated in Fig. 8 and also shown in dotted lines at 25′ in Fig. 3. The antenna element 25 remains in the inoperative position 25′ throughout the rotation of antenna system 19.

Thus, when the antenna system 19 is driven by the motor 26 for providing an output signal indicating the direction of an enemy aircraft, antenna element 25 is held in its inoperative position and the antenna system 19 is characterized by the undistorted pattern 51. On the other hand, when the system is driven only by the motor 31 in azimuthal search for vessels upon the sea, the element 25 is in operative position and the antenna system 19 is characterized by the distorted directivity pattern 52 required for this purpose. From the foregoing description it will be seen that, with the mechanism illustrated in Figs. 6, 7 and 8, it is unnecessary to make any manual adjustment or alteration in the antenna system 19 to provide for the change of directivity characteristics thereof, since the presence or the absence of centrifugal force acting upon the antenna element 25 controls the position of element 25 to modify the antenna directivity pattern automatically.

It will be readily apparent that it is not essential to the successful use of the mechanism of Figs. 6, 7 and 8 that the parabolic reflector 22 be rotated along with the wave guide 44 and the antenna elements 23 and 24. While the dual-purpose radar system illustrated provides for rotation of the reflector 22 in fixed relation to the wave guide 44, other radio object detection systems of a type employing a rotating exciting element cooperating with a stationary reflector are suitable for incorporation of rotation-responsive apparatus such as that shown in Figs. 6, 7 and 8.

From the foregoing description, it is seen that an antenna element 25, positioned between a parabolic or paraboloidal reflector 22 and the focal zone thereof, at a point separate from the axis of the reflector, may be employed for producing a distorted and asymmetrical directivity pattern which is especially adapted for use in aircraft radar systems for detecting vessels upon the sea. While the element 25 could be made manually removable, or manually adjustable, an arrangement is provided in the present invention by which this element is shifted automatically from an effective or operative position to an ineffective or inoperative position by merely changing the movement of the directive antenna system from an oscillatory movement to a rotational movement.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Directive antenna apparatus for producing an asymmetrical directivity pattern, comprising a reflector having a parabolic cross-section defining a directive axis and a focus, an antenna element positioned at the focus of said parabolic reflector, a radio energy conduit coupled thereto, and means disposed asymmetrically about said axis for producing asymmetry of said directive pattern, said means comprising a directivity pattern modifying parasitic conductive antenna element positioned at a point separate from said axis and between said reflector and said focus.

2. Directive antenna apparatus for producing an asymmetrical directivity pattern, comprising a paraboloidal reflector defining an axis and a focal point, an antenna element positioned at said focal point, and a directivity pattern modifying conductive antenna element movable with respect to said antenna element at said focal point and positioned at a point separate from said axis and between said reflector and said focal point for changing the directivity pattern of said antenna apparatus.

3. Directive antenna apparatus as defined in claim 2, wherein said directivity pattern modifying element comprises a dipole antenna element.

4. Directive antenna apparatus for producing an asymmetrical directivity pattern, comprising a paraboloidal reflector defining an axis and a focal point, an antenna element positioned in the region of said focal point, means for supplying to said antenna element electromagnetic energy of a predetermined frequency and wavelength, and a directivity pattern modifying conductive element positioned at a point substantially one wavelength from said axis and two wavelengths from said focal point between said focal point and said reflector, both dimensions being in terms of said predetermined frequency and wavelength.

5. Directive antenna apparatus as defined in claim 4, wherein the distance along said axis between said reflector and said focal point is substantially four wavelengths at said predetermined frequency and wavelength.

6. Radio transmitting antenna apparatus comprising a paraboloidal reflector defining a directive axis and a focal point, ultra high frequency energy supplying means extending through said reflector substantially along said axis to said focal point for radiating energy from the region of said focal point toward said reflector to produce energy transmission in a directive pattern, and a dipole antenna element positioned between said focal point and said reflector at a predetermined distance from said axis for modifying said directive transmission pattern, said dipole element being situated substantially midway between said focal point and said reflector and comprising an asymmetrical pattern modifier.

7. Dual-purpose radio scanning apparatus comprising a paraboloidal reflector defining a directive axis and a focal point, ultra high frequency energy supplying means extending through said reflector along said axis to said focal point for radiating energy from the region of said focal point toward said reflector to produce energy transmission in a directive pattern, means selectively operable for rotating said ultra high frequency energy supplying means, eccentric conductive means supported by said energy supplying means and positioned between said focal point and said reflector for modifying said directive transmission pattern, and means coupled to said pattern modifying means for rendering said pattern modifying means inoperative during rotation of said ultra high frequency energy supplying means.

8. Dual-purpose radio scanning apparatus comprising a paraboloidal reflector defining a directive axis and a focal point, ultra high frequency energy supplying means extending through said reflector substantially along said axis to the region of said focal point for radiating energy from said region toward said reflector to produce energy transmission in a directive pattern, means selectively operable to rotate said energy supplying means and to oscillate said energy supplying means and said reflector, and means supported by said energy supplying means for modifying said directive transmission pattern only during oscillation of said energy supplying means.

9. Dual-purpose radio scanning apparatus as defined in claim 8, wherein said transmission pattern modifying means comprises an antenna element normally resiliently restrained in an operative position but compelled to take an inoperative position by centrifugal force acting thereon during rotation of said energy supplying means.

10. Dual-purpose radio scanning apparatus as defined in claim 8, wherein said transmission pattern modifying means comprises a dipole antenna element restrained in an operative position substantially perpendicular to a line parallel to said axis during oscillation of said energy supplying means but compelled to take an inoperative position substantially parallel to said axis by centrifugal force acting thereon during rotation of said energy supplying means.

11. Dual-purpose radio scanning apparatus as defined in claim 8, wherein said transmission pattern modifying means comprises a dipole antenna element, a cylindrical member attached thereto having a helical cam slot, and means attached to said energy supplying means for movably supporting said cylindrical member and engaging said cam slot to produce rotation of said member accompanying translation thereof.

12. Dual-purpose radio scanning apparatus as defined in claim 8, wherein said transmission pattern modifying means comprises a dipole antenna element, a cylindrical member attached thereto having a helical cam slot, means attached to said energy supplying means for movably supporting said cylindrical member and engaging said cam slot to limit said member to combined translational and rotational movement, and resilient means for urging said member toward said axis, whereby centrifugal force acting on said antenna element and said cylindrical member during rotation of said energy supplying means opposes said resilient means to shift said antenna element into an inoperative position.

13. Movable antenna apparatus comprising a paraboloidal reflector defining a directive axis and a focal point, an ultra high frequency energy conduit extending through said reflector substantially to said focal point, means positioned in the region of said focal point for providing energy communication between said reflector and said conduit, a conductive dipole antenna element positioned intermediate said focal point and said reflector and spaced from said directive axis, and rotation responsive means for changing the effectiveness of said conductive dipole antenna element according to changes of motion of said antenna apparatus.

14. Directive antenna apparatus comprising a paraboloidal reflector defining a directive axis and a focal point, exciter means situated in the region of said focal point and substantially symmetrical about said axis for directing microwave energy toward said reflector, and means situated asymmetrically about said axis and between said focal point and said reflector for rendering the directivity pattern of said antenna apparatus asymmetrical about said axis, said last-named means comprising at least one dipole element situated appreciably farther than one-half wavelength from said focal point.

JOHN E. KARLSON.

REFERENCES CITED

The following references are of record in the file of this patent:

UNITED STATES PATENTS

| Number | Name | Date |
|---|---|---|
| 2,156,653 | Ilberg | May 2, 1939 |
| 2,287,533 | Peterson | June 23, 1942 |
| 2,370,053 | Lindenblad | Feb. 20, 1945 |
| 2,412,867 | Briggs et al. | Dec. 17, 1946 |
| 2,419,556 | Feldman | Apr. 29, 1947 |
| 2,422,579 | McClellan | June 17, 1947 |
| 2,429,601 | Biskeborn et al. | Oct. 28, 1947 |